United States Patent

[11] 3,616,408

[72] Inventor Willsim M. Hickam
 Pittsburgh, Pa.
[21] Appl. No. 732,950
[22] Filed May 29, 1968
[23] Division of Ser. No. 514,871,
 Dec. 20, 1965, Pat. No. 3,404,836
[45] Patented Oct. 26, 1971
[73] Assignee Westinghouse Electric Corporation
 Pittsburgh, Pa.

[54] OXYGEN SENSOR
 4 Claims, 7 Drawing Figs.
[52] U.S. Cl. .................................................. 204/195,
 136/86, 136/153, 137/93, 431/18
[51] Int. Cl. .................................................... G01n 27/46
[50] Field of Search ......................................... 204/1.1,
 195; 136/86, 86 A, 86 D, 153

[56] References Cited
 UNITED STATES PATENTS
 3,188,283  6/1965  Cole ............................. 204/1.1
 3,359,188 12/1967 Fischer ......................... 204/1.1
 3,378,478  4/1968  Kolodney et al. ............. 204/195
 3,400,054  9/1968  Ruka et al. .................... 204/1.1
 3,403,090  9/1968  Tajiri et al. .................... 204/1.1

Primary Examiner—T. Tung
Attorneys—F. H. Henson and C. F. Renz

ABSTRACT: An oxygen solid-electrolyte cell is provided having a pair of longitudinal holes. The interior of each of the holes is coated with a porous platinum coating which provides the electrodes of the cell. Each of the holes is adapted to be connected to a separate source of gas to permit flow of different gases over the electrodes within the holes.

OXYGEN SENSOR

This is a division of my application Ser. No. 514,871, filed Dec. 20, 1965, now U.S. Pat. No. 3,404,836, and assigned to the same assignee.

This invention relates to the art of generating heat and has particular relationship to the generation of heat by the combustion reaction of a fossil fuel and oxygen. The fuel is usually fluid, for example, oil, gas or powdered coal, and the combustion is produced by continuous supply of the fuel and air into a combustion chamber where the reaction between the fuel and the oxygen in the air takes place. Sufficient air is supplied to provide an excess of oxygen. The efficiency of the reaction varies as a function of the relationship between the quantities of fuel and oxygen that take part in the reaction; that is, as the oxygen-to-fuel ratio, and data is available from which relationships that lead to optimum efficiencies may be derived. The control of the efficiency is of importance economically but it is also important to control the furnace to minimize the presence in the furnace output of air pollutants. In some situations economic efficiency leads to minimizing pollution; in others economic efficiency demands different operation than that which leads to minimum pollution. The reference to efficiency here is intended to include within its scope the desired operation of a furnace whether economy or minimum pollution is sought. It is an object of this invention to provide combustion apparatus in which the relationship of the flow of oxygen and fuel shall be so controlled that the optimum efficiency is achieved and/or air pollution is minimized.

The oxygen-to-fuel ratio in the feed to the combustion apparatus may be set by determining the oxygen content of the gases flowing through the stack and by adjusting the ratio in accordance with this determination. In the practice of the prior art, the oxygen content is determined by batch-type analysis. A gas sample is extracted from the flow and analyzed. This practice has proved unsatisfactory because of the unreliability of the analysis and because of the delay imposed by the analysis of the adjustment of the relationship between the oxygen and the fuel.

It is an object of this invention to overcome the above-described disadvantages and to provide apparatus in which the relationship of the flow of oxygen and fuel into a combustion chamber shall be continuously and reliably controlled in dependence upon precise continuous determination of the oxygen content of the gases involved in the combustion reaction.

In accordance with this invention, the oxygen involved in the combustion reaction is continuously sensed by an oxygen solid-electrolyte cell which is interposed in the gas involved in the reaction. A typical such cell is disclosed in application Ser. No. 279,466, filed to William M. Hickam on May 10, 1963 for device for Monitoring Oxygen Content of Gases, now U.S. Pat. No. 3,347,767. This Hickam application Ser. No. 279,466 is incorporated in this application by reference. Briefly, the oxygen solid-electrolyte cell includes a tube of an electrolyte material including zirconia and thoria and containing such oxides as calcium oxide, yttrium oxide and lanthanum oxide. The tube is coated on the inside and outside with porous platinum which is electrically conducting. The inside and outside coatings are insulated from each other and serve as electrodes. When the electrolyte is heated to a high temperature, between about 400° and 1,000° C. and the electrodes are connected in an electrical circuit, a difference of potential is produced in this circuit. The magnitude of this potential is dependent on the partial pressures of the oxygen on one side of the cell to the partial pressure of the oxygen on the other side; specifically, the partial pressures of the oxygen flowing through the tube to the partial pressure of the oxygen outside of the tube. There may be other gases in the fluid flowing through the tube or outside of the tube but the pressures of these additional gases do not affect the potential.

In accordance with this invention the cell is connected so that the gases involved in the combustion reaction are transmitted through the tube. In the usual practice of this invention, these gases are derived from the flue or stack through which the products of combustion are exhausted. The gases may also be derived by sampling the input to the burner of the apparatus. In either event, the cell produces a potential depending on the partial pressure of the oxygen in the gases transmitted through the tube and a partial pressure of the oxygen outside of the tube. Typically, the latter is air and the comparison partial pressure is the partial pressure of oxygen in the air. The potential produced by the cell is impressed to control the relationship or ratio between the fuel and the oxygen supplied to the burner in such a way that a highly efficient operation is achieved. This control is instantaneously dependent on the gases being supplied or the gases being exhausted and continuously adjusts the relationship between the oxygen and the fuel.

An important feature of this invention arises from the discovery that condensation of the water vapor in the fluid being transmitted through the cell, particularly if this fluid is derived from the stack, must be suppressed to prevent damage to the cell. The gases involved in the combustion reaction are transmitted to and away from the cell by conductors between the source and exhaust of the gases and the cell; it has been discovered that, if these conductors are substantially cooler than the cell and the region from which the gases are derived, the water vapor tends to condense in these conductors and ultimately blocks the conductors. Under the pressure of the gas, the water blocking the conductor is then forcibly projected against the walls of the tube in the cell cracking the tube. An important feature of this invention is the provision of means for suppressing the accumulation of water from the vapor in the gases being transmitted to and/or away from the cell. Specifically, this precipitation of water may be suppressed by heating the conductors through which the gases are transmitted. The precipitation and deposit of the water may also be suppressed by providing a trap in the conductors or connecting conductors free of bends so that they conduct the gas continuously from a low vertical to an upper vertical level.

For a better understanding of this invention both as to its organization and as to its method of operation, together with additional objects and advantages thereof, reference is made to the following description taken in connection with the accompanying drawings, in which.

Figure 1:
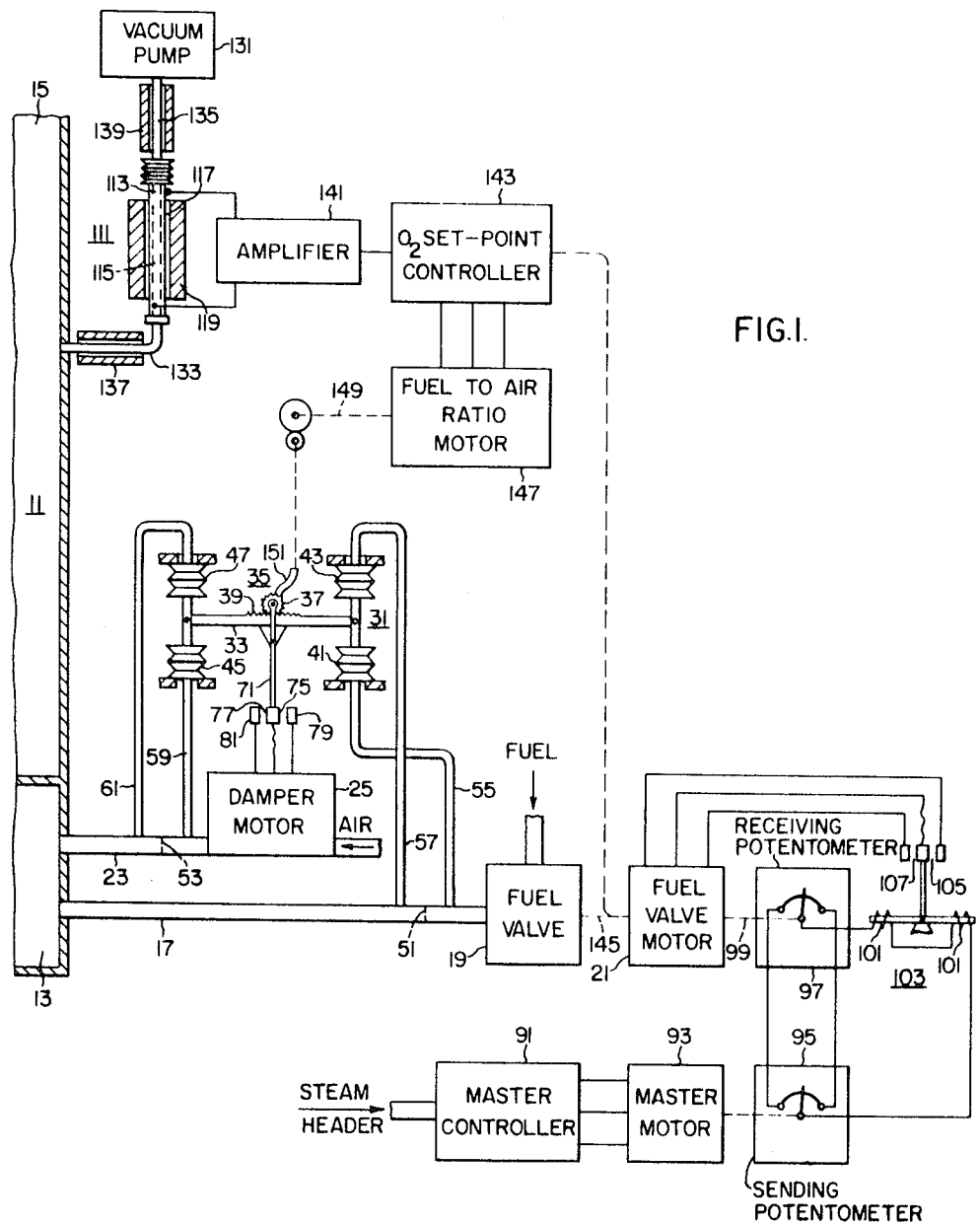
FIG. 1 is a diagrammatic view showing an embodiment of this invention in which the control of the oxygen-to-fuel ratio is controlled in dependence upon the oxygen in the furnace duct or stack.

The apparatus shown in the drawings includes a furnace 11 for generating steam for industrial or domestic purposes, for example, for the operation of steam turbines. The furnace has a firebox 13 in which fuel, for example, gas or oil, is reacted with the oxygen in air and a duct 15 through which flow the gases involved in and resulting from the reaction. The fuel is supplied to the furnace through a fuel line 17 and is controlled by a fuel valve 19 which may be set by a fuel valve motor 21. The air passes into the firebox through an air line 23 in which there is a damper the position of which is controlled by a damper motor 25. Both the fuel valve motor 21 and the air control or damper motor 25 may be operated in either direction to increase or decrease the fuel or air respectively.

In the practice of this invention the oxygen-to-fuel ratio may be controlled either by adjusting the oxygen flow or by adjusting the fuel flow. In the apparatus shown in FIGS. 1 through 4 the oxygen flow is adjusted by adjusting the inflow of air. The damper motor is controlled by a proportioning meter 31. This meter 31 includes a lever 33 having a fulcrum 35 which may be set at different positions near the center of the arm by setting a pinion 37 movable along a rack 39. A pair of bellows 41 and 43 and 45 and 47 respectively are provided at each end of the lever 33 and the angular position of the arm is determined by the relationship of the pressures of the fluid in these bellows and on the position of the fulcrum 35, about which the lever 33 is pivotal. The bellows 41 and 43 at one end (the right in FIGS. 1 and 2) respond to pressures dependent on the fuel flow in the fuel line 17 and the bellows at the other end (left) have pressures dependent on the airflow in the air line 23. To achieve this relationship of pressures each of the lines 17 and 23 is provided with a diaphragm 51 and 53 respectively. Diaphragm 51 is interposed between tubes 55 and 57 connecting the line 17 to the bellows 41 and 43 respectively, and diaphragm 53 is interposed between tubes 59 and 61 connecting the line 23 to bellows 45 and 47 respectively. Each tube 55 through 59 applies pressure to the bellows 41 through 47 respectively to which it is connected and the magnitude of the pressures applied is dependent on the pressure at the point where the tube communicates with its associated line 17 or 23. A pressure difference dependent on the flow of the fuel is impressed between the bellows 41 and 43 at one end of the pivoting lever 33; and a difference dependent on the flow of air is impressed between the bellows 45 and 47 at the other end. The differential in the fuel pressure tends to pivot the lever 33 in a counterclockwise direction, and the differential in air pressure tends to pivot the lever 33 in a clockwise direction; the net differential in pressure, taking into consideration both the air and the fuel, determines whether the lever 33 pivots in a clockwise or counterclockwise direction.

The effect of given pressure differentials is dependent on the position of the fulcrum 35 which is set in accordance with the relationship of the oxygen-to-fuel ratio desired. The lever 33 carries an arm 71 having movable switch contacts 75 and 77 at its end; these contacts are engaged by one or the other of cooperative fixed contacts 79 and 81. The contacts 75 and 79 and 77 and 81 are connected to control the direction of rotation of the motor damper 25. The closing of the contacts 75 and 79 on the right by counterclockwise pivoting of the lever 33 operates the motor 25 in a direction to increase the airflow and the closing of the contacts 77 and 81 on the left by clockwise rotation of the lever 33 operates the motor in a direction to reduce the airflow.

The fuel valve motor 21 is controlled in accordance with the load demands of the apparatus. For this purpose, a master controller 91 is provided; this controller is connected to respond to the steam demand which the furnace 11 is to meet. This controller 91 controls a master motor 93 which drives a sending potentiometer 95. The sending potentiometer 95 controls a receiving potentiometer 97 which is reset by the fuel motor 21 as it operates the fuel valve 19 through shaft 99. The sending and receiving potentiometers 95 and 97 are connected bucking to the coils 101 of a differential relay 103. Any difference in the settings of the potentiometers 95 and 97 causes the relay 103 to pivot in one or the opposite direction closing one or the other of sets of contacts 105 and 107. The contacts control the fuel valve motor 21 which is driven in one or the opposite direction in dependence upon the unbalanced of the potentiometers at the same time resetting the receiving potentiometer 97 to reduce the current through the relay coil to zero. Thus the valve 19 is set in accordance with the demands of the boiler.

The position of the fulcrum of the proportional meter is controlled from a fuel cell 111 in dependence upon the oxygen in the fluid exhausted through the furnace duct. This cell 111 includes a solid-electrolyte ceramic tube 113 such as one composed of thoria or zirconia and oxides of calcium or related materials. The tube 113 is coated on the inside and outside with porous platinum layers 115 and 117. The coatings 115 and 117 are insulated from each other and serve as output electrodes for the cell. A furnace 119 is provided for heating the cell to a temperature of between 400° and 1,000° C. The temperature should be maintained substantially constant.

To determine the quantity of oxygen in the flue gas, a portion of the gas is drawn through the tube 113 of the fuel cell 111 by a vacuum pump 131. The tube 113 is connected to the vacuum pump 131 and to the furnace stack 15 by tubes 133 and 135 which are heated by heaters 137 and 139 to suppress the condensations of vapor in these tubes.

Figure 7:
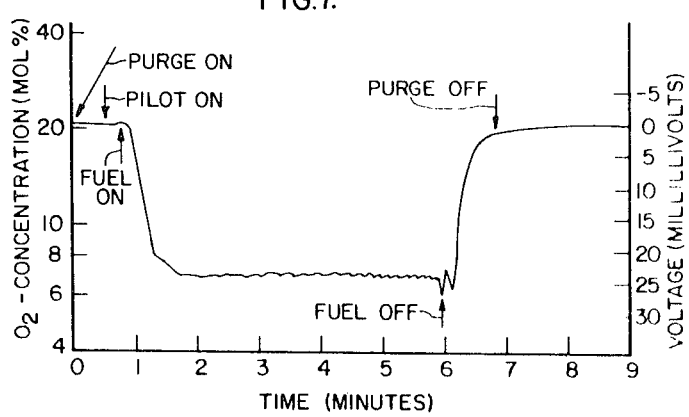
FIG. 7 is a graph illustrating the operation of this invention.

A typical relationship for a cell of the type disclosed in application Ser. No. 279,466 is shown in FIG. 7. This view is a graph in which time is plotted horizontally in minutes and oxygen concentration is mol percent and voltage in millivolts are plotted vertically. The oxygen concentration is plotted, on a logarithmic scale, on the left and the voltage, on a linear scale, on the right. The curve was prepared with air in which the oxygen concentration is about 21 percent on the outside of the tube 113.

FIG. 7 represents a situation, as indicated by the arrows, in which the furnace in FIG. 1 is turned on and thereafter turned off. It is assumed that the furnace is purged beginning at the time zero and ending in a time interval somewhat less than a minute, when the pilot is turned on. At this point the fuel is being burned and oxygen of a predetermined concentration is being transmitted through the interior of the tube 113. After a predetermined time interval the fuel is turned off and the purge is turned off and at this point the cycle of operation is completed. The oxygen then again rises to the concentration of the oxygen and air and the voltage output of the fuel cell becomes zero.

The portion of the curve in FIG. 7 on the left corresponds to a concentration of about 21 percent within the tube. Under such circumstances, the voltage generated by the cell is approximately zero. A decrease in the partial pressure of the oxygen within the tube to approximately 7 or 7½ percent results in an increase in the generated voltage to about 23 millivolts. This generated voltage is used to control the fuel valve.

A potential dependent on the difference in partial pressures of the oxygen in the fluid derived from the furnace 11 and the air around the outside of the tube 113 of the cell 111 appears between the electrodes 115 and 117 of the cell. This potential is supplied to the input of an amplifier 141. The output potential of the amplifier 141 is compared in an $O_2$ set-point controller 143 with potential corresponding to the desired oxygen flow. This controller 143 may be set on the basis of available data giving the ratio of the oxygen to the fuel for different fuels and different loads which produces optimum efficiency. Generally this data calls for an excess of oxygen over that required to react completely with the fuel. The excess is higher at lower fuel flow than at higher fuel flow. Typically, the excess may be 4 percent at the highest fuel flow and as much as 7 or 10 percent at the lowest fuel flow. In this range the furnace 11 operates at high efficiency and pollution is minimized. The $O_2$ set-point controller 143 may be set automatically from the drive shaft 145 of the fuel valve motor 21 as indicated or it may be set by hand. In the $O_2$ set-point controller 143 the output of the amplifier is balanced against the voltage setting of the controller and a fuel-to-air ratio motor 147 is actuated to rotate in one direction or the other.

The shaft 149 of the fuel-to-air ratio motor 147 is connected typically through a flexible shaft 151 to the pinion 37 which sets the fulcrum 35 of the lever 33 in the proportional meter 31. If an increase in the flow of air is required the pinion 37 is moved to the left. Under such circumstances the lever 33 carrying the contacts 75 and 77, if initially balanced at a given airflow, is pivoted so that 75 engages the right-hand contact 79. The damper motor 25 is then operated in a direction such as to increase the air. If a decrease in air is required the pinion is moved to the right causing the contact 77 on the contact bar 71 to engage the left-hand contact 81 to reduce the airflow.

In the use of the apparatus shown in FIG. 1 a change in the demands of the steam boiler which may be manifested by a pressure switch (not shown) actuates the master controller 91 to drive the master motor in turn rotating the movable arm of the potentiometer 95 to a new position. The relay 103 is then actuated in one direction or the other and depending on the direction causes the fuel valve motor 21 to operate and at the same time causes the receiving potentiometer 97 to be reset until the closed contact 105 or 107 of the relay 103 opens. At this point the operation of the fuel valve motor 21 is interrupted. Any change in the oxygen in the duct 15 produced by the change in the fuel flow is manifested by a change in the voltage at the output of the amplifier 141. As a result, the fuel-to-air ratio motor 147 is operated in one direction or the other to properly set the air flowing into the firebox 13.

Figure 2:
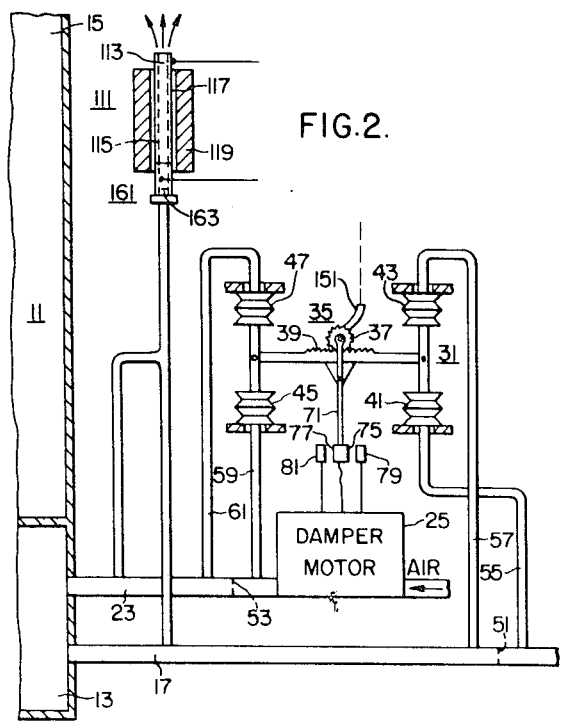
FIG. 2 is a fragmental diagrammatic view showing a modification of this invention in which the control is in dependence upon the oxygen in the inflow to the furnace is sampled rather than on the oxygen in the duct fluid.

The apparatus shown in FIG. 2 is similar to the apparatus shown in FIG. 1 except that the gas which produces the indication of the fuel cell 111 is derived not from the duct 15 but from the inflow air and fuel lines 23 and 17 to the firebox. This fuel and air is reacted in a region 161 at the entrance to the tube 113 of the fuel cell 111 so that the fuel cell measures the excess oxygen not reacted. To facilitate the reaction a platinum gauze 163 may be deposited at this entrance. The gauze 163 is heated by the furnace 119 sufficiently to effectuate the combustion reaction. The air is set as in the FIG. 1 modification to achieve the most efficient combustion of the fuel.

Figure 3:
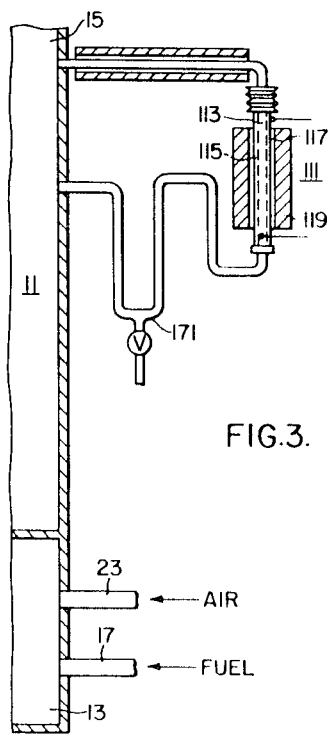
FIG. 3 is a fragmental diagrammatic view showing a further modification of this invention similar to FIG. 1.
Figure 4:
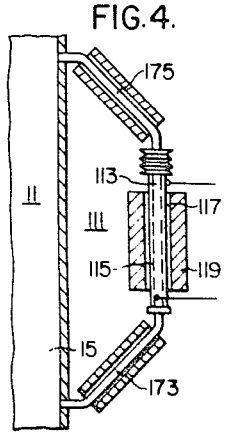
FIG. 4 is still another fragmental diagrammatic view showing still another modification of this invention similar to FIG. 1.

The apparatus shown in FIG. 3 is similar to the apparatus shown in FIG. 1 except that the water vapor in the gases transmitted through the fuel cell is permitted to condense then is collected in a water trap 171 from which it may be removed periodically. The apparatus shown in FIG. 4 is similar to that shown in FIG. 1 except that the conductors 173 between the tube and the fuel cell and the duct is sloped so that any moisture which is precipitated flows back into the duct. The top conductor 175 is heated to suppress condensation. The top conductor 175 may be omitted in a furnace with a pressurized duct.

Figure 5:
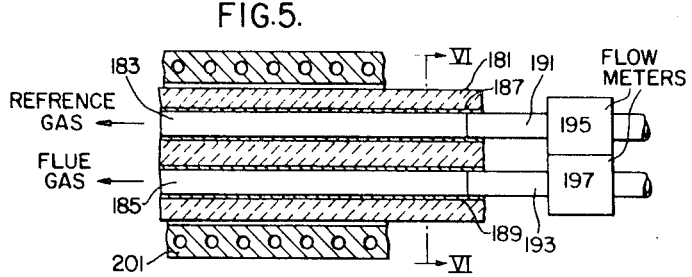
FIG. 5 is a view in longitudinal section showing the manner in which this invention is practiced with an oxygen cell of a different structure than that incorporated in the apparatus shown in FIGS. 1 through 4.
Figure 6:
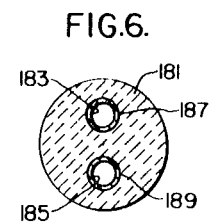
FIG. 6 is a section taken along line VI—VI of FIG. 5.

FIGS. 5 and 6 disclose an alternative fuel cell which may be used in the apparatus shown in FIGS. 1 through 4 in place of the fuel cell 111 shown. The fuel cell shown in FIGS. 5 and 6 includes a ceramic tube 181 of a material similar to that of the single-hole cell 111 having a pair of axial longitudinal holes 183 and 185 preferably symmetrically displaced with reference to the axis of the cylinder 181. The interior of each of the holes is coated with porous platinum 187 and 189. The coatings 187 and 189 are insulated from each other and constitute the electrodes of the cell. Each electrode 187 and 189 is adapted to be connected to a source of gas through a platinum tube 191 and 193 and a flowmeter 195 and 197 capable of determining the rate of flow of the gas. The output voltage for the cell is derived from connections to the platinum tubes 191 and 193. The ceramic cylinder is enclosed in a furnace 201 of the type used in the single-tube cell.

In the practice of the invention as shown in FIGS. 1 through 4 with the cell disclosed in FIGS. 5 and 6 a reference gas is transmitted through one of the holes 183 and the flue or stack gas under observation is transmitted through the other 185. Preferably, the flowmeters 195 and 197 may be set so that the rate of flow of the reference gas and of gas under test is the same. Typically, the reference gas may be air but since this gas is flowing instead of stagnant as in the case involving the single-tube cell 111 no error is introduced by reason of the difference in the state of the gases. In addition the reference gas may be set to have the oxygen content required to achieve the desired oxygen-to-fuel ratio so that any departure of the voltage output of the cell from zero would indicate a departure of the oxygen in the flue gas from the desired gas.

The following summary may aid in understanding this invention.

A major source of energy is the combustion of fossil fuels. The extraction of the maximum energy from the combustion process depends to a large extent on optimizing continuously the air-or-oxygen-to-fuel ratio in the feed. One parameter which continuously reflects this ratio is the excess molecular oxygen in the exhaust flue gas. In large furnace systems, where a fraction of 1 percent departure from maximum efficiency represents a large fuel waste, precise automatic control is desirable. Present systems, for accomplishing this usually provide a batch-type analysis or, if continuous, have a slow response. In general such systems require the extraction of the gas sample from the flue and do not operate in situ. This invention is an automatic flue-to-air ratio feed control system using a solid-electrolyte oxygen sensor or cell 111 subject to, or mounted directly in, the flue gas exhaust from a fossil fuel burning furnace.

The sensor 111 consists of a lime stabilized, zirconia electrolyte in the form of a tube operating at elevated temperature. The interior and exterior surfaces 117 and 119 consist of conducting porous platinum which serves as electrodes. The cell 111 provides a voltage signal proportional to the logarithm of the ratio of the oxygen pressure at the anode and cathode. The operating temperature range of the cell is 400°–1,000° C. Other suitable electrolyte materials would include zirconia and thoria containing CaO, $Y_2O_3$, $La_2O_3$ and other oxides.

FIG. 7 is a graph which shows the manner in which the cell 111 operates in controlling a furnace. In obtaining the data the reference electrode gas was oxygen in air at atmospheric pressure. The curve is a tracing taken from a recorder chart. The cell output is shown on the right in millivolts. The measured oxygen concentration plotted vertically on the left was verified by mass spectrometric analyses.

This invention relates to the direct installation of the gauge in the flue gas flow and utilizing this output signal for maintaining a specified oxygen concentration in the flue gas through the use of a feedback loop to valves controlling the feed rate of air and/or fuel to the combustion chamber 13. For example, in FIG. 7 the control system would become operative within a specified time interval after the fuel-on condition and continue to control until the fuel-off part of the cycle. During this operative time of control, error signals, as indicated by departure from a 23 millivolt signal, would be fed into a differential amplifier 141 and motor control valves which control the gas-feed rate. If the signal dropped below 23 millivolts indicating an excess air in the flue gas, the gas fuel feed rate would be increased or the air decreased to restore the flue gas to the designated oxygen concentration as indicated by the 23 millivolt cell output. If the signal increased above 23 millivolts indicating oxygen content in the flue gas was lower than that specified, the signal operating through the differential amplifier 141 would serve to decrease the gas fuel feed or increase the air and restore the oxygen level to that specified. Thus, by specifying the output voltage for a desired oxygen concentration, it is possible to control the oxygen concentration in the flue gas to the desired level. The system is also applicable to vary the combustion of air and fuel feed.

In general furnaces are designed to operate within a limited range of air-to-fuel feeds. It is within the scope of this invention in its broader aspects that the feed volume control capabilities of the system be limited to such a range to limit the size and reduce the cost of such control feed components as would be automatically operated through a feedback loop from the oxygen gauge output.

The electrochemical sensor cell 111 shown in FIGS. 1 through 4 is of cylindrical tube form with one electrode 117 on the inner wall and the other 119 on the outer wall, other cell geometries are applicable. A particularly attractive cell geometry is that shown in FIGS. 5 and 6 of a cylindrical tube 181 containing two axial holes 183 and 185 separated by a partition with electrodes 187 and 189 on each side of the partition. This cell geometry allows a controlled and variable reference oxygen pressure to be supplied at one electrode 187 and the gas under test to be supplied at the second electrode 189. This configuration permits flow of the reference and test gas in identical systems for direct comparison of their relative oxygen content. This is not possible in the single-hole gauge where the reference is static air and the test gas is under flow through a small tube 113. The increased pressure of the gas to achieve the flow through single-hole cell leads to zero displacement of the order of 3 mv. where the reference and test are the same oxygen concentration. In the two-hole embodiment with identical flow resistance, the cell output would be zero for identical reference and test gas. In this case the magnitude of the error signal would be approximately a linear function of the change in oxygen concentration of the test gas since the initial portion of the logarithmic curve can be closely approximate by a straight line. Furthermore, the voltage polarity of the cell serves to specify the direction of control required to restore the system and the magnitude of the error signal provides information as to the magnitude of correction required. Also a single control system can operate over a wide range of oxygen concentration by simply changing the oxygen reference gas.

Although the use of the cell has been described primarily for automatically maintaining the proper oxygen level in the flue gas from a fossil fuel fired furnace, it is intended to include the programming of the entire furnace cycle. As seen in FIG. 7, the cell responds to the entire furnace cycle by supplying a time-dependent voltage signal. It is then disclosed that voltage signals generated through the entire furnace cycle could be used for emergency shutdown or interruption of the normal furnace cycle. The rapid response time of the cell (0.01–0.001 sec.) makes such a system feasible.

Although the system described utilizes a resistance furnace to maintain the cell at operating temperature, the cell would operate in many high-temperature flue gas systems without this auxiliary heat source. Here the high-temperature flue gas would serve to heat the cell directly.

In multiple burner furnaces with separate burner controls, the individual oxygen sensors for sampling the combustion products of each burner, would serve to optimize the efficiency of all burners simultaneously.

While preferred embodiments of this invention have been disclosed herein, many modifications thereof are feasible. This invention then is not to be restricted except insofar as is necessitated by the spirit of the prior art.

I claim as my invention:

1. An oxygen sensor gauge comprising a solid-electrolyte means exhibiting the property of conductivity of oxygen ions with negligible electronic conductivity, a first electronically conductive tubular electrode having first and second surfaces with said first surface disposed in contact with said electrolyte means, a second electronically conductive tubular electrode having first and second surfaces with said first surface disposed in contact with said electrolyte means, a first means operatively associated with said first electrode for directing flow of a reference gas over the second surface of said first electrode and a second means operatively associated with said second electrodes for directing a flow of sample gas over said second surface of said second electrode, the first surfaces of said first and second tubular electrodes being the outer surfaces and the second surfaces of said first and second tubular electrodes being the inner surface.

2. The device in claim 1 in which said tubular members are spaced apart by substantially an equal distance along their length.

3. An oxygen sensor gauge comprising a solid-electrolyte means exhibiting the property of conductivity of oxygen ions with negligible electronic conductivity, a first electronically conductive tubular electrode having first and second surfaces with said first surface disposed in contact with said electrolyte means, a second electronically conductive tubular electrode having first and second surfaces with said first surface disposed in contact with said electrolyte means, a first means operatively associated with said first electrode for directing flow of a reference gas over the second surface of said first electrode and a second means operatively associated with said second electrodes for directing a flow of a sample gas over said second surface of said second electrode, said first and second means including means for controlling the flow of said gases to provide a similar rate of flow of said gases over their respective electrodes, the first surfaces of said first and second tubular electrodes being the outer surfaces and the second surfaces of said first and second tubular electrodes being the inner surfaces.

4. The device in claim 3 in which said tubular electrodes are spaced apart in a noncoaxial relationship.

* * * * *